Figure 1:
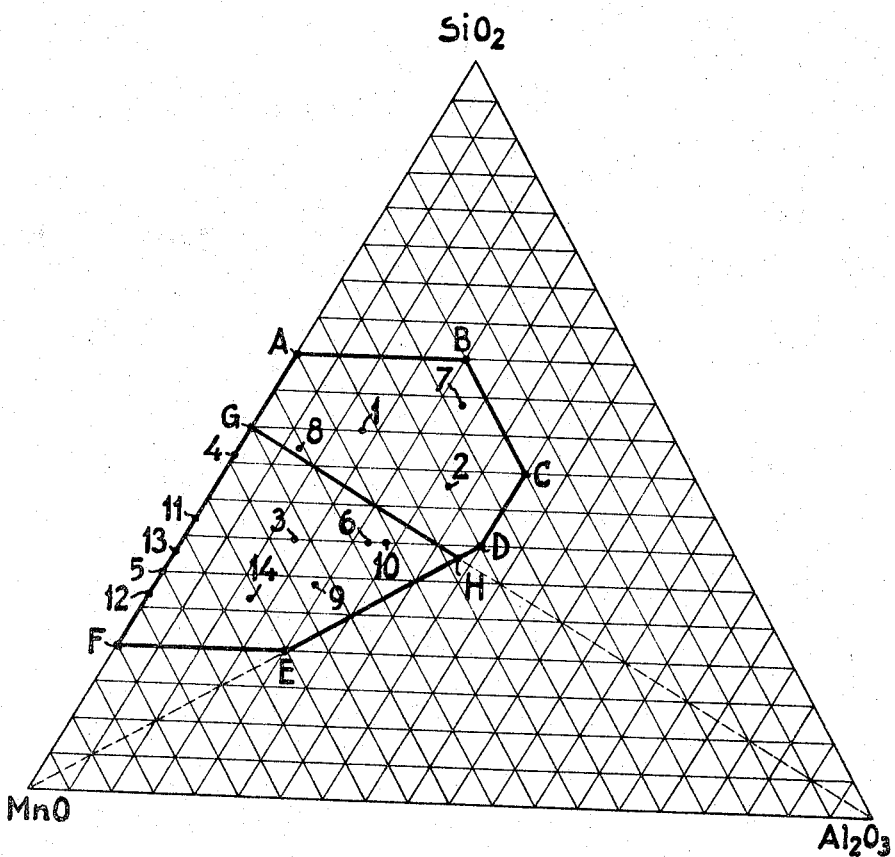

United States Patent Office 3,317,298
Patented May 2, 1967

3,317,298
PROCESS FOR JOINING SURFACES OF REFRACTORY MATERIAL WITH A MnO-SiO$_2$-Al$_2$O$_3$ SYSTEM
Johannes Theodorus Klomp, Theodoor Peter Johannes Botden, and Marius Annie Frans Klop, all of Emmasingel, Eindhoven, Netherlands, assignors to North American Philips Company, Inc., New York, N.Y., a corporation of Delaware
Filed Mar. 30, 1964, Ser. No. 355,821
Claims priority, application Netherlands, Apr. 11, 1963, 291,499
5 Claims. (Cl. 65—32)

The invention relates to the establishment of fused joints on objects consisting of ceramic materials and/or metals.

Said fused joints may provide objects having a locally fused mass, as the case may be in the form of the seal of an opening in an object and composite objects, parts of which are joined together by such a layer.

The invention may be employed for highly different ceramic materials, such as products consisting wholly or mainly of Al$_2$O$_3$, MgO, BeO, SiO$_2$, ZrO$_2$, UO$_2$ and furthermore materials on the basis of compounds such as silicates, aluminates, zirconates, ferrites and the like. Suitable metals are high-melting-point metals such as: Pt, Mo, W, Ta, Nb and furthermore metals having melting points above approximately 1350° C., for example Fe, Ni and alloys thereof.

It is known that such joints can be made with glass of different compositions. The compositions are preferably chosen so that the expansion coefficient does not differ too much from that of the materials on which the joint is to be made. It is also known that if these expansion coefficients are so different from each other that after cooling of the melt such high stresses are produced that the joint cracks; this disadvantage can be obviated by a suitable geometry of the objects to which the joint is applied and by the use of a very thin fusion layer.

In general, the known joints have disadvantages with respect to adhesion, rigidity, thermal resistance and/or vacuum-tightness.

According to the invention fused joints on objects of ceramic material and/or metal not exhibiting such disadvantages or having them only to a strongly reduced extent are established with the aid of materials which consist mainly of compounds in the ternary system: MnO-SiO$_2$-Al$_2$O$_3$, having 20 to 60% by weight of SiO$_2$, 0 to 35% by weight of Al$_2$O$_3$ and 20 to 80% by weight of MnO, wherein the content of SiO$_2$ is higher than that of Al$_2$O$_3$, while up to about 15% by weight of other metal oxides may be added, which can be absorbed without objection in the melt and/or have a favorable effect on the machining or the properties of the joint.

Suitable additions are oxides of alkali-metals, earth-alkali-metals, iron, zinc, titanium, boron and phosphorus.

For completeness' sake it should be noted that glass compositions of the system of MnO-SiO$_2$-Al$_2$O$_3$ are already known from "Advances in Glass Technology, Technical Papers of the Sixth International Congress on Glass" July 8 to 14, 1962 (Plenum Press, New York). This publication contains data about the stability, the thermal expansion, the spectral transmission and the electric resistance of these glasses. Any indication about the usability of such compounds as connecting material is not given therein.

In the production of the connecting materials the starting substances may be, apart from the oxides, also the compounds which are converted during heating into the oxides, for example carbonates and hydroxides and furthermore compounds of the oxides with each other, for example silicates.

The said compositions in the ternary system of MnO-SiO$_2$-Al$_2$O$_3$ are located within the hexagon ABCDEF of the diagram shown in FIG. 1 of the drawing.

For establishing the joint a mixture of the starting substances of a composition lying within the said region, as the case may be in a pre-reacting state, are applied and melted at temperatures above about 1100° C., depending upon the composition.

The connecting material is preferably applied in the form of a powder, for example with the aid of a suspension or a paste. Owing to the fact that the materials concerned very satisfactorily wet in the molten state the ceramic material and the metal, said material may also be arranged in the form of one or more larger pieces on the surfaces where the joint has to be made. When a joint is established between parts for example a bar and a plate, it is even not necessary to arrange the connecting material between the parts; it may suffice to apply the material near the joint to be made. After melting the material will then flow by capillary forces between the parts.

In accordance with the temperature and the period of melting constituents of the ceramic material on which the joint is made, such as Al$_2$O$_3$ and SiO$_2$ can be absorbed in the fusing layer in greater or smaller quantities. Thus a joint can be obtained, which has a softening temperature exceeding the melting temperature of the starting composition.

The fused joints according to the invention have high mechanical quality, a satisfactory adhesion and are vacuum-tight up to temperatures near the softening temperature which always exceeds 850° C.

As far as the joint is made on ceramic material or non-oxidizing metals, the fusion can be carried out in air. Part of the available bivalent manganese will obtain, however, a high valency due to oxidation. Thus the joint becomes slightly electrically conducting. If a joint of optimum insulating capacity is desired, the fusion must be carried out in a non-oxidizing gas atmosphere, for example in argon, nitrogen, hydrogen or mixtures thereof. The use of such a gas atmosphere is also important when the joints have to made on readily oxidizable metals. It may sometimes be desirable to use a moist gas in order to obtain a superficial oxidation of metal parts, so that a satisfactory adhesion is furthered. In establishing joints by heating in a non-oxidizing gas atmosphere it is important to use connecting materials which are free of readily reducible substances, such as ZnO and TiO$_2$.

In accordance with the composition the joint may consist, subsequent to cooling, of a glass-like phase alone or it may contain, in addition, a crystalline phase. In the latter case the softening temperature is raised and in general the joints having a low content of crystalline phase have better mechanical properties.

Crystallization occurs readily in the range of compositions lying inside the quadrangle EFGH indicated in the diagram of FIG. 1, where the percentage by weight of MnO exceeds that of the SiO$_2$. The crystallization can be furthered by slow cooling or by heating for a longer time, for example 10 minutes, at temperatures lying between the melting temperature and about 800° C.

In the following Table 1 there is given a number of compositions, corresponding to the numbers 1 to 14 like in FIG. 1 of the drawing. The table indicates the melting temperature T, at which the compositions are completely melted and the softening temperature D of the joint obtained, which temperature is a measure for the permissible thermal load. Moreover, any crystallization of these joints is indicated at the composition concerned.

The softening temperature D, referred to above, is defined by the following measurement:

Two bars of dimensions: 10 x 2 x 1 mms., consisting of 99.8% by weight of Al$_2$O$_3$, are joined to each other by a fusing layer of a thickness of about 50μ. The assembly is disposed over a width of 2 mms. of the bars on knife-like supports, which are each spaced apart from the area of the joint by a distance of 7.5 mms. The joint is loaded with a weight of 0.8 g. Then heating is carried out with a rise in temperature of 5° C. a minute. The softening temperature D is defined as the temperature at which sagging starts. The table gives the results of two measurements.

The joints were established by heating for 2 minutes at temperatures exceeding by 50° C. the melting temperatures T indicated in Table 1. Heating was carried out in an electric furnace comprising a molybdenum helix protected from oxidation by a nitrogen-hydrogen atmosphere. During cooling the temperature was held at 800° C. for 10 minutes. In the table it is indicated with which composition crystallization then occurs. If the temperature is held at 1100° C. during cooling for 10 minutes, crystallization occurs with all compositions mentioned here. Further cooling was carried out in both cases at a rate of about 100° C. a minute.

TABLE 1

| No. | Composition in percent by weight | | | T in °C. | D in °C. | |
|---|---|---|---|---|---|---|
| | $Al_2O_3$ | $SiO_2$ | MnO | | | |
| 1 | 13 | 50 | 37 | 1,150 | 930 | 950 |
| 2 | 27 | 43 | 30 | 1,300 | 1,200 | 1,190 |
| 3 | 13 | 35 | 52 | 1,160 | 1,070 | 850 Cryst. |
| 4 | | 46 | 54 | 1,300 | 1,220 | 1,230 Cryst. |
| 5 | | 30 | 70 | 1,400 | 1,190 | 1,190 |
| 6 | 22 | 35 | 43 | 1,195 | 900 | 900 |
| 7 | 23 | 54 | 23 | 1,200 | >1,350 | 1,350 Cryst. |
| 8 | 7 | 47 | 46 | 1,200 | 890 | 1,070 |
| 9 | 19 | 29 | 52 | 1,200 | 1,150 | 1,160 Cryst. |
| 10 | 24 | 35 | 41 | 1,200 | 920 | 930 |
| 11 | | 38 | 62 | 1,190 | 1,090 | 1,160 Cryst. |
| 12 | | 27 | 73 | 1,350 | 1,200 | 1,200 Cryst. |
| 13 | | 33 | 67 | 1,300 | 1,290 | 1,250 Cryst. |
| 14 | 11 | 27 | 62 | 1,150 | 1,190 | 1,130 Cryst. |

In order to give an idea of the breaking stress of the joints Table 2 indicates for a few of the compositions of Table 1 the force K in kilograms, at which the joint concerned broke down in the arrangement described above.

The measurements concerned are carried out on joints between bars of a square section of 4 mms.² of 99.8% of $Al_2O_3$ ceramic material and on joints between bars of a square section of 4 mms.² of an Fe-Ni-Co-alloy (54 Fe, 28 Ni, 18 Co) and bars consisting of the said $Al_2O_3$ ceramic material and having the sectional areas indicated therewith.

The thickness of the joint was less than 50μ. The joints were established by heating as indicated above in Table 1. For the compositions indicated heating is not carried out in air, but in a reducing gas atmosphere in order to avoid oxidation of the Fe-Ni-Co-alloy. To this end use was made of a moist gas flow consisting of 25% by volume of $H_2$ and 75% by volume of $N_2$, passed through a column of water of a height of 4 cms.

A number of the joints was directly cooled to room temperature at a rate of about 100° C. a minute, so that the glass-like state of the joints was maintained. A further number of the joints was held during cooling at a temperature of about 1000° C. for 10 minutes, so that the layer became substantially completely crystalline, after which cooling was carried on also at a rate of about 100° C. a minute.

The bars were disposed for measuring purposes at a distance of 25 mms. from the joint on either side of knifelike supports and loaded at the area of the joint at room temperature by a force K until breakage occurred. The force K is indicated in the table in kilograms. It is furthermore indicated how the breakage occurred. Breakage beyond the joint in the $Al_2O_3$ is designated by *a*, breakage at the boundary surface with Fe-Ni-Co by *b* and breakage in the layer of the joint by *c*.

TABLE 2

| Composition | Breaking stress in kgs. | | | |
|---|---|---|---|---|
| | Compound $Al_2O_3$-$Al_2O_3$ | | Compound Fe-Ni-Co-$Al_2O_3$ | |
| | Glass | Crystallised | Glass | Crystallised |
| 3 | 16.2 a<br>14.1 c<br>16.8 a<br>14.5 c | 4.9 c<br>7.0 c | 13.2 b<br>11.3 b | 3.3 b<br>5.7 b |
| 9 | 15.2 a<br>14.7 c<br>14.3 a | 6.6 c<br>7.1 c | 6.5 b<br>6.0 b | 6.1 b<br>3.8 b |
| 12 | 12.4 c<br>7.1 c<br>7.0 c | 7.1 c | 4.2 b<br>2.6 b | 4.2 b<br>2.6 b |

Furthermore there was tested the influence of a few additions on the melting temperature and the crystallization of the melt.

To the composition 3 there was added $Na_2O$, BaO, CaO, FeO, ZnO and $B_2O_3$ in a quantity of 10%, the ZnO and FeO as such. The $B_2O_3$ was added in the form of $H_3BO_3$ and the further materials in the form of carbonates. The mixtures were previously reacted in air at about 1000° C. The joint was established by melting at a temperature exceeding by 50° C. the temperature T for 2 minutes in a moist nitrogen-hydrogen atmosphere of the composition indicated above and by cooling to room temperature at a rate of 100° C. a minute.

It was assessed that the melting temperature, which was 1160° C. for the composition 3, was raised to 1200° C. by the addition of BaO and reduced to 1100° C. by the addition of $B_2O_3$. The addition of $Na_2O$, CaO, FeO and ZnO had little influence on the melting temperature.

It was furthermore found that the additions, with the exception of that of $B_2O_3$, were conducive to the crystallization. In the following Table 3 it is indicated the percentage of the crystal phase estimated roughly by optical agency, obtained by melting for 10 minutes and by subsequent cooling at a rate of 100° C. a minute on a surface of the $Al_2O_3$ ceramic material and of one of the alloys of Fe-Ni-Co respectively. Fusion was carried out in a moist mixture of 25% by volume of $H_2$ and 75% by volume of $N_2$.

TABLE 3

| Composition | Percent of crystal phase on— | |
|---|---|---|
| | $Al_2O_3$ | Fe-Ni-Co |
| No. 3 | 1 | 100 |
| No. 3+10 percent $Na_2O$ | 95 | 100 |
| No. 3+10 percent BaO | 100 | 100 |
| No. 3+10 percent CaO | 70 | 100 |
| No. 3+10 percent FeO | 95 | 100 |
| No. 3+10 percent ZnO | 60 | 100 |
| No. 3+10 percent $B_2O_3$ | 0 | 5 |

The percentage of crystal phase obtained by cooling, subsequent to melting, to 600° C. at a rate of 100° C. a minute and by subsequent heating at 1000° C. for 10 minutes, is substantially 100 for all compositions with the exception of that having an addition of $B_2O_3$. It was furthermore assessed that wetting of the Fe-Ni-Co-surfaces is less satisfactory with the composition 3 including the additions than that without additions.

Figure 2:
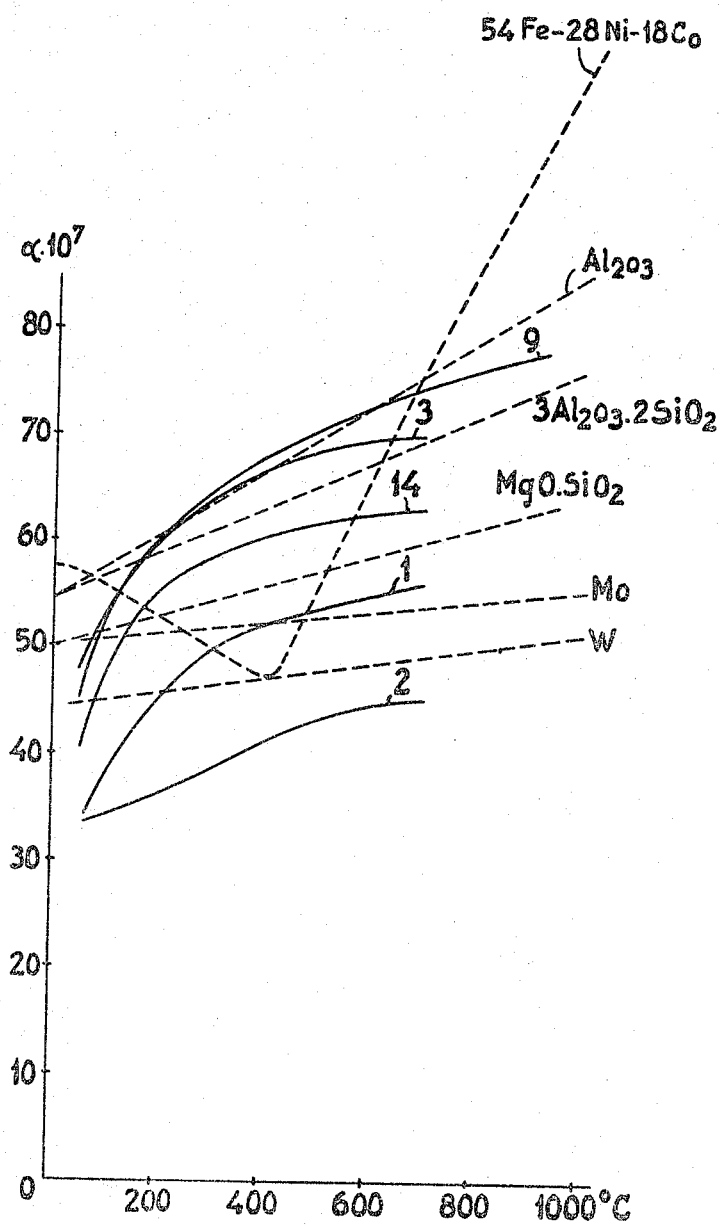

FIG. 2 illustrates for the compositions 1, 2, 3, 9 and 14 of Table 1 the course of the expansion coefficient α as a function of temperature. By way of comparison this figure also illustrates the course of the expansion coefficient of a few materials on which the fused joints according to the invention can be established, i.e. tungsten, molybdenum, the alloy 54 Fe-28 Ni-18 Co and ceramic material consisting of 99.8% by weight of $Al_2O_3$, aluminum silicate ($3Al_2O_3 \cdot 2SiO_2$) and magnesium silicate ($MgO \cdot SiO_2$).

It appears therefrom that by the choice of the composition a suitable matching of the expansion of the connecting material to that of the materials to be joined can in many cases be found.

The invention is particularly important for the manufacture of electron tubes, thermo-elements, uranium oxide fuel elements and, in general, for structures in which joints between parts of ceramic material and/or of metal are desired. The invention may furthermore be employed in sealing openings in such parts and for locally covering surfaces thereof. There may, for example, be provided an electrically insulating layer on metal objects. Since the connecting materials adhere satisfactorily to the metals melting at a temperature exceeding about 1350° C. and since this is of course also the case with metals in a powdery form, the connecting materials according to the invention, having a content of said powdery metals, permit obtaining electrically conducting layers on ceramic material, on which soldering joints of a solder composition of 71% by weight of Cu, 28% by weight of Ag, 1% by weight of Si can be established. The quantity of metal powder desirable in these mixtures for obtaining good results depends upon the granular size and on the temperature at which heating is performed and on the atmosphere of the heating process. In general, the content of metal powder of the mixtures lies between about 60 and 90%. With a higher content the joints are usually mechanically too weak and with a lower content the electrical conductivity is too low.

For a further explanation of the invention a few further examples are given below in addition to the embodiments referred to in the description of Tables 1, 2 and 3.

(1) An opening of a diameter of 0.5 mm. in a plate of molybdenum and in a plate of an alloy of 54 Fe–28 Ni–18 Co is sealed with the aid of the composition 3 by heating in a hydrogen atmosphere at 1200° C. for 2 minutes.

(2) An opening of a diameter of 1 mm. in ceramic plates of a thickness of 3 mms. of 95% of $Al_2O_3$ and of $MgO \cdot SiO_2$ respectively is sealed by fusing in air the composition 9 heated at 1250° C. for two minutes.

(3) An electrically insulating layer of a thickness of 0.2 mm. consisting of the compositions 3 and 9 respectively is obtained by fusing in an atmosphere of 25% by volume of $H_2$ and 75% by volume of $N_2$ on a plate of a thickness of 0.5 mm. of molybdenum and an alloy of 54 Fe–28 Ni–18 Co respectively by heating at 1210° C. and 1250° C. respectively for 2 minutes.

(4) On a ceramic plate of a thickness of 3 mms. of 98% by weight of $Al_2O_3$ there is made a layer of the composition 14 of a thickness of about 0.1 mm. by heating at 1200° C. for 2 minutes. When use is made of a $H_2$-$N_2$ atmosphere a layer is obtained, the resistivity of which exceeds $10^{14}$ ohm. cm. If heating is carried out in air, some amount of oxidation of bivalent manganese occurs and as a result the resistivity is reduced to about $10^8$ ohm cm.

(5) An electrically conducting layer of a thickness of 0.05 mm. is fused onto ceramic plates of 95% by weight of $Al_2O_3$ and of $MgO \cdot SiO_2$ with the use of a mixture of 1 part by weight of the composition 6 with 4 parts by weight of platinum powder having an average granular size of $10\mu$. Heating is carried out in air at 1250° C. for 30 minutes.

(6) On the end face of a bar of ceramic material of 95% of $Al_2O_3$ and having a square section of 5 mms.$^2$ there is fused a mixture of the composition 3 and molybdenum having a granular size of less than $1\mu$ in a ratio by weight of 1:4 in a moist $N_2$-$H_2$ atmosphere. Heating is carried out at 1300° C. for about half an hour, while the molybdenum powder slightly sinters.

Then a bar of 54 Fe–28 Ni–18 Co is joined by soldering by means of an alloy of 70 Au–16 Cu–14 Ni (in percent by weight) in a hydrogen atmosphere at 1000° C.

The breaking stress K of this joint, measured in the manner described above, was 10 kgs. The breakage occurred in the ceramic material.

(7) To a surface of a fuel element of sintered uranium oxide is fused at 1250° C. for 2 minutes the composition 9 in a $H_2$-$N_2$ atmosphere to join a thermo-element of Ni-NiFe.

(8) A ceramic bar of 99.8% by weight of $Al_2O_3$, having a diameter of 4 mms. was joined to a plate of niobium and tantalum respectively by means of the composition 9 by heating at 1250° C. in a argon atmosphere for 2 minutes.

(9) On a plate of monocrystalline magnesia of a square section of 20 mms.$^2$ and a thickness of 2 mms. there was fused a layer of the composition 10 of a thickness of about 0.1 mm. by heating at 1250° C. in a $H_2$-$N_2$ atmosphere for 2 minutes.

What is claimed is:

1. A method of joining two surfaces each of a refractory material having a melting point exceeding 1100° C. to form a seal therebetween which is vacuum tight up to 850° C. comprising the steps of placing between the surfaces a bonding material consisting essentially of a compound in the ternary system $MnO$-$SiO_2$-$Al_2O_3$ having 20 to 60% by weight of $SiO_2$, 20 to 80% by weight of MnO, and up to 35% by weight of $Al_2O_3$, said composition lying within the area A-B-C-D-E-F-G-A of the ternary phase diagram shown in FIGURE 1 of the accompanying drawing, heating said bonding material for at least two minutes to a temperature above 1100° C. and at least 50° C. above the melting point thereof in a non-oxidizing protective atmosphere, and cooling the melted bonding material to form a bond between the two surfaces.

2. A method of joining surfaces as claimed in claim 1 in which the weight percent of MnO exceeds that of $SiO_2$ and the composition lies within the area E-F-G-H-E of the ternary phase diagram shown in FIGURE 1 of the accompanying drawing.

3. A method of joining surfaces as claimed in claim 2 in which the material is cooled to a temperature between the melting point of the bonding composition and 800° C. and maintained at said latter temperature for about 10 minutes to further crystallization in the composition.

4. A method of joining surfaces as claimed in claim 1 in which the bonding material contains between 60 and 90% by weight of a metal powder having a melting point exceeding 1350° C. to increase the electrical conductivity of the resulting bond.

5. A method of joining surfaces as claimed in claim 1 in which the bonding material includes about 10% by weight of a compound selected from the group consisting of $Na_2O$, BaO, CaO, FeO, ZnO and $B_2O_3$.

References Cited by the Examiner

UNITED STATES PATENTS 3,093,598 6/1963 McMillan et al. _____ 106—52 X
3,184,370 5/1965 Luks _____ 65—43 X
3,197,290 7/1965 Williams _____ 65—33

S. LEON BASHORE, *Acting Primary Examiner.*

DONALL H. SYLVESTER, *Examiner.*

F. W. MIGA, *Assistant Examiner.*